United States Patent
Wang

[11] Patent Number: 6,073,581
[45] Date of Patent: Jun. 13, 2000

[54] DOG TOY FOR DISPENSING DOG FOOD

[76] Inventor: Steve Yueh-Yu Wang, 6F, No. 31, Chungshan N. Raod, Sec. 3, Taipei, Taiwan

[21] Appl. No.: 09/261,949

[22] Filed: Mar. 3, 1999

[51] Int. Cl.[7] ............................. A01K 5/00; A07K 29/00
[52] U.S. Cl. ..................... 119/51.01; 119/707; 119/711; 473/594
[58] Field of Search ................................ 119/51.01, 707, 119/702, 708, 709, 710, 711; D30/160; 473/569, 594; 446/168

[56] References Cited

U.S. PATENT DOCUMENTS

| | | |
|---|---|---|
| D. 287,988 | 1/1987 | Billinghurst . |
| 693,821 | 2/1902 | De Ford . |
| 3,841,039 | 10/1974 | Farnsworth, III . |
| 4,890,838 | 1/1990 | Rudell et al. . |
| 5,476,408 | 12/1995 | Hoeting et al. .......................... 446/419 |
| 5,758,604 | 6/1998 | Jorgensen ................................ 119/711 |
| 5,870,971 | 2/1999 | Krietzman et al. ..................... 119/707 |

Primary Examiner—Peter M. Poon
Assistant Examiner—Yvonne R. Abbott
Attorney, Agent, or Firm—Pro-Techtor International Services

[57] ABSTRACT

A ball-like dog toy includes a spherical shell and a cylindrical valve, the spherical shell being formed of two symmetrical half shells, the half shells having ribs and partition boards, the cylindrical valve being mounted in a hole on the spherical shell and retained between the ribs and partition boards of the half shells and rotated within a limited angle, wherein dog food is discharged out of the spherical shell through the cylindrical valve when the spherical shell is rolled on the ground; discharging of dog food is stopped when the dog stops from playing with the dog toy.

7 Claims, 5 Drawing Sheets

DOG TOY FOR DISPENSING DOG FOOD

BACKGROUND OF THE INVENTION

The present invention relates to a dog toy, and more particularly to a ball-like dog toy which discharges dog food when played by a dog.

When dog food is put in a dish to feed a dog, the dish tends to be turned over by the dog, causing dog food to be spread over the ground. In order to eliminate this problem, a variety of animal food feeders have developed. However, these animal food feeders are commonly complicated. Another drawback of these conventional animal food feeders is that they cannot dispense food subject to the need of the pet. Furthermore, because these animal food feeders are design to dispense animal food only, they cannot be used as a toy for a pet.

SUMMARY OF THE INVENTION

The present invention has been accomplished under the circumstances in view. It is the main object of the present invention to provide a ball-like dog toy which automatically dispenses dog food when played by a dog, or stops from dispensing dog food when maintained immovable. According to the present invention, the ball-like dog toy is comprised of a spherical shell, and a cylindrical valve mounted in a hole on the spherical shell and rotated in the hole within a limited angle. The spherical shell has rib and partition means on the inside for guiding contained dog food to input ports on the cylindrical valve. When the dog plays with the ball-like dog toy, the spherical shell is rolled on the ground, and dog food is guided by the rib and partition means to the input ports on the cylindrical valve and then discharged out of an output port of the cylindrical valve during rolling of the spherical shell on the ground.

DETAILED DESCRIPTION OF THE PREFERRED EMBODIMENT

Figure 1:
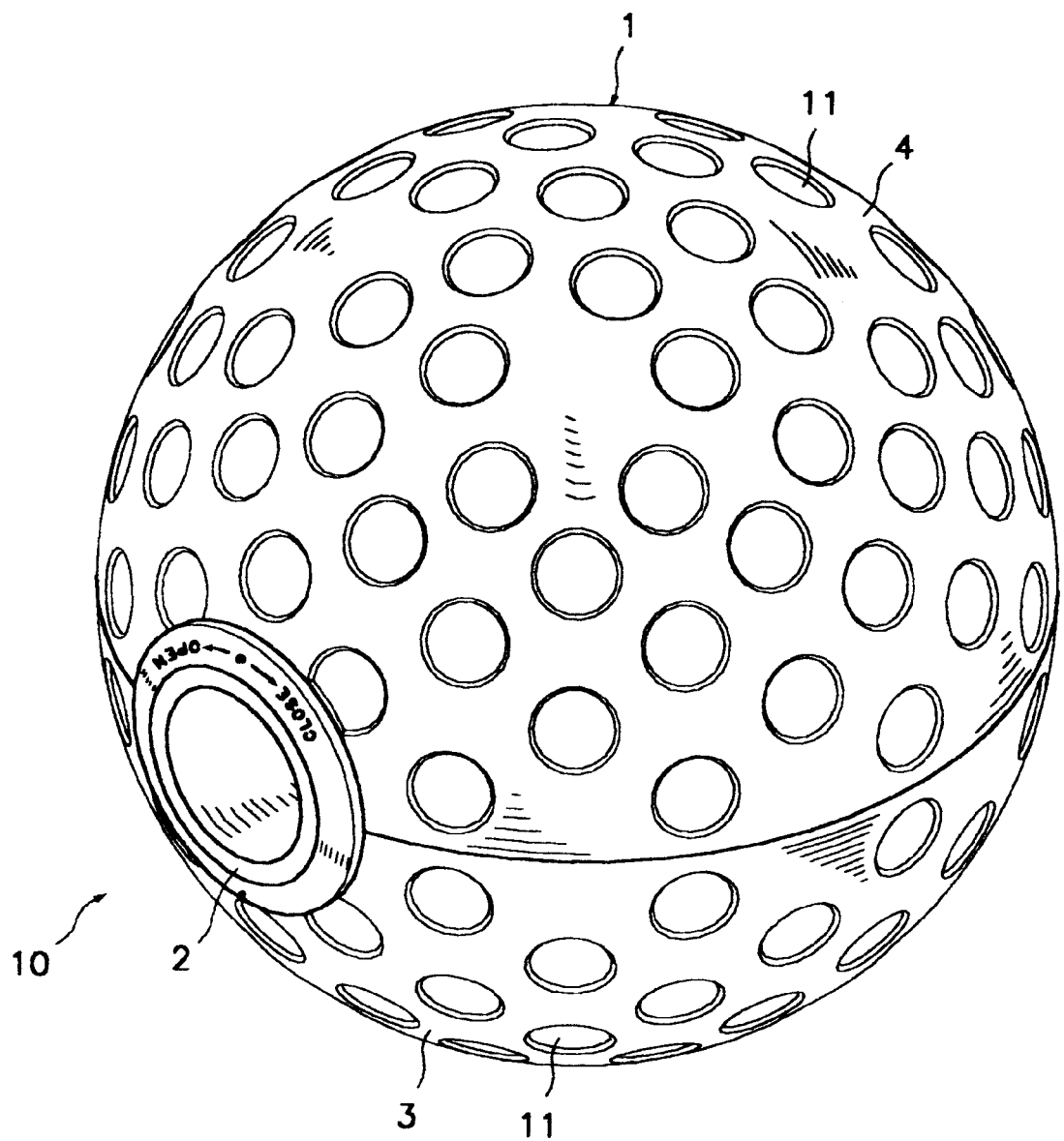
FIG. 1 is a perspective view of a ball-like dog toy according to the present invention.
Figure 2:
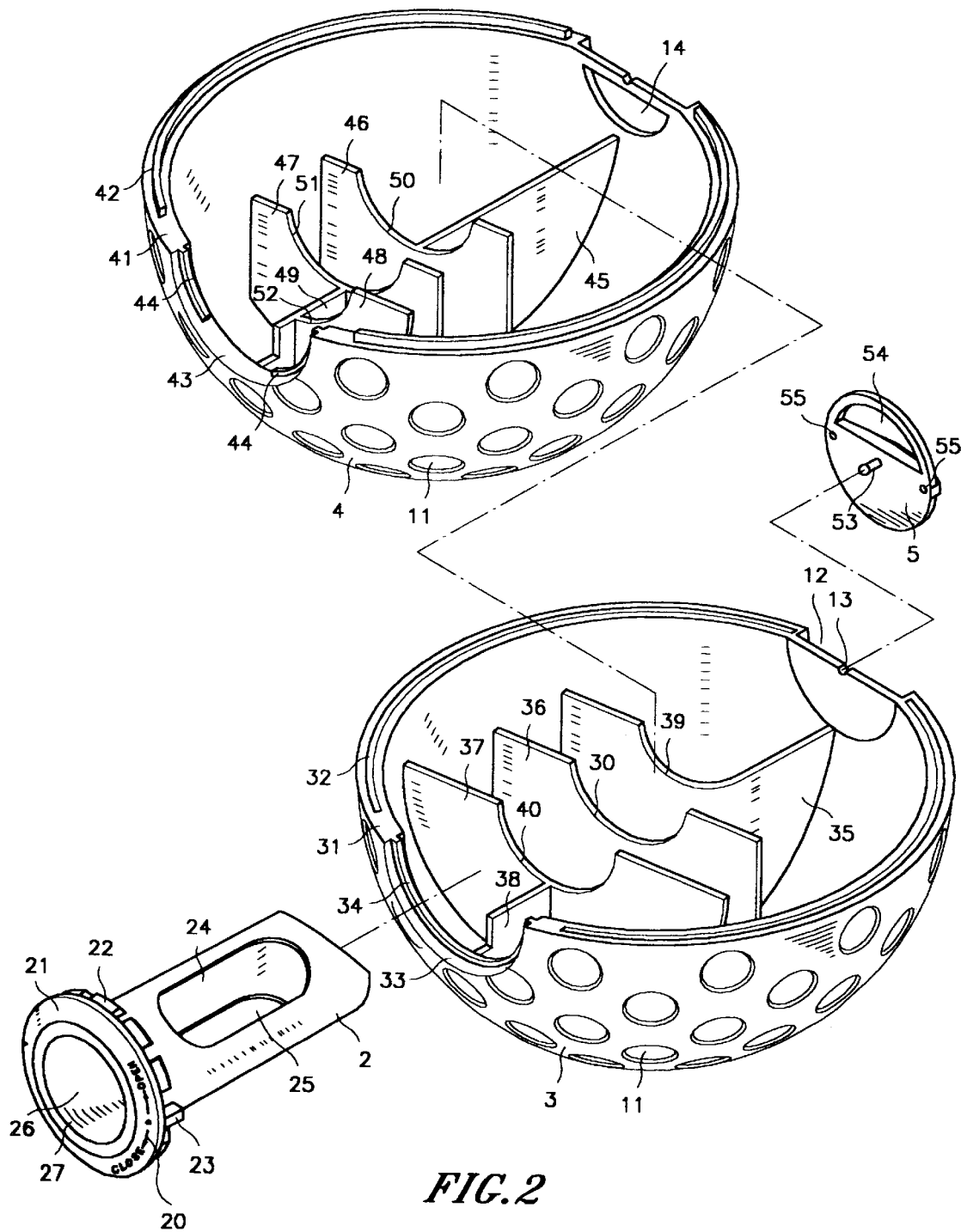
FIG. 2 is an exploded view of the ball-like dog toy shown in FIG. 1.

Referring to FIGS. 1 and 2, a ball-like dog toy 10 is shown comprised of a spherical shell 1, a cylindrical valve 2, and a cap 5.

Figure 3:
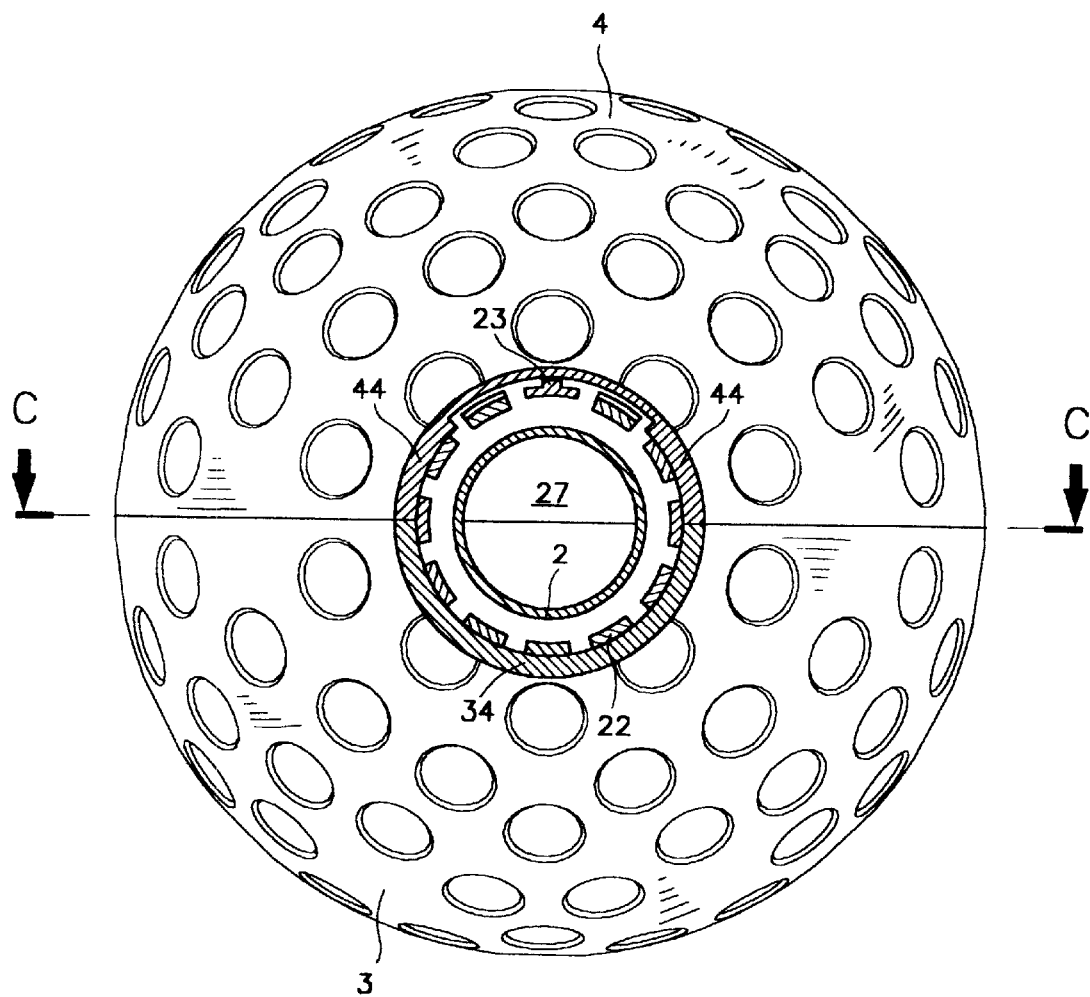
FIG. 3 is a cutaway view of the present invention, showing the positioning of the cylindrical valve in the circular hole of the spherical shell.
Figure 4:
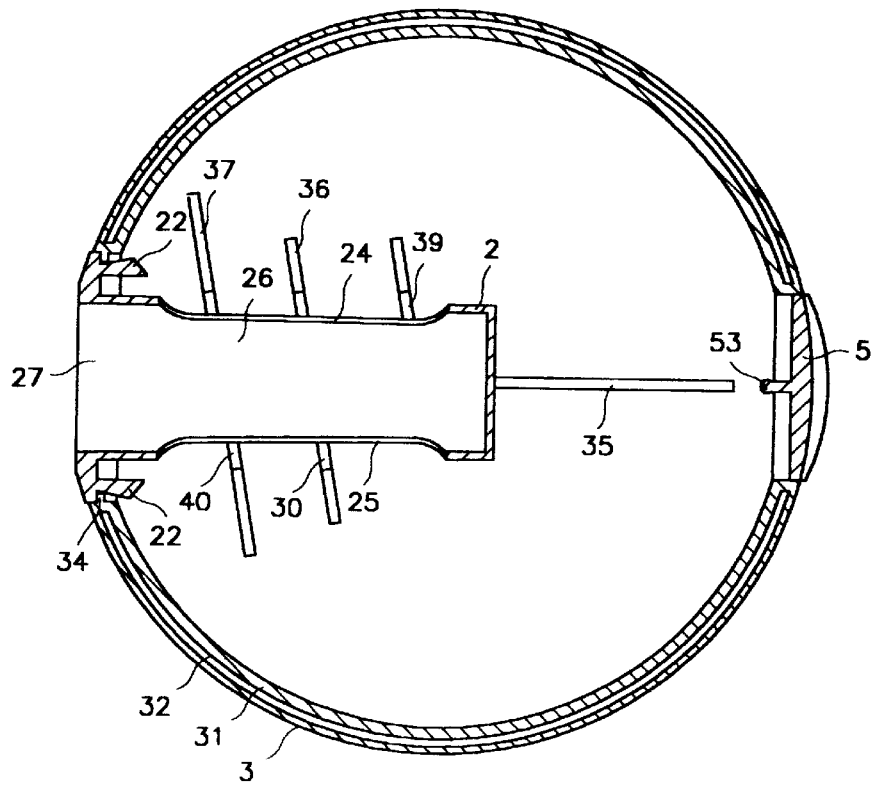
FIG. 4 is a sectional view taken along line C—C of FIG. 3.

The spherical shell 1 has a plurality of rounded recesses 11 at the outside wall thereof, which increase the friction resistance between the spherical shell 1 and the ground when the spherical shell 1 is played by a dog on the ground. The spherical shell 1 is comprised of a first hemispherical half 3 and a second hemispherical half 4. The first hemispherical half 3 has a coupling edge 31, and a coupling groove 32 provided at the coupling edge 31. The second hemispherical half 4 has a coupling edge 41, and a coupling flange 42 raised from the coupling edge 41. By press-fitting the coupling flange 42 into the coupling groove 32, the coupling edges 31,41 are abutted against each other, and the hemispherical halves 3,4 are fastened together, forming the spherical shell 1. When the hemispherical halves 3,4 are fastened together, the connecting area between the coupling edges 31,41 are sealed by a ultrasonic sealing apparatus. Referring to FIGS. 3 and 4 and FIG. 2 again, the hemispherical halves 3,4 each have a semi-circular peripheral notch 33 or 43. When the hemispherical halves 3,4 are fastened together, the semi-circular peripheral notches 33,43 form a circular hole, which receives the cylindrical valve 2. The first hemispherical half 3 has a stop flange 34 raised along the periphery of its semi-circular peripheral notch 33. The second hemispherical half 4 has two stop flanges 44 bilaterally raised along the periphery of its semi-circular peripheral notch 43. The stop flanges 33,34 stop the cylindrical valve 2 from falling to the inside of the spherical shell 1. The stop flanges 44 of the second hemispherical half 4 are spaced by a space, which determines the angle of rotation of the cylindrical valve 2 in the circular hole 33,43 of the spherical shell 1.

Referring to FIG. 4 and FIG. 2 again, the first hemispherical half 3 comprises a first rib 35, a second rib 36, a third rib 37, and a stop board 38. The first rib 35 is an angled plate, having one end integral with the peripheral wall of the first hemispherical half 3, an opposite end spaced from the peripheral wall of the first hemispherical half 3 at a distance, and an arched top notch 39 at the top. The second rib 36 is a flat board spaced between the first rib 35 and the third rib 37 and transversely disposed inside the first hemispherical half 3, having two opposite ends respectively spaced from the peripheral wall of the first hemispherical half 3 at a distance, and a semi-circular top notch 30 on the middle. The third rib 37 is a flat board transversely disposed inside the first hemispherical half 3, having two opposite ends respectively connected to the peripheral wall of the first hemispherical half 3, and a semi-circular top notch 40 on the middle in line with the semi-circular top notch 30 at the second rib 36 and the arched top notch 39 at the first rib 35 for supporting the cylindrical valve 2 (see FIG. 4). The stop board 38 is perpendicularly extended outwards from the third rib 37 on the middle, and connected to the peripheral wall of the first hemispherical half 3.

Figure 5:
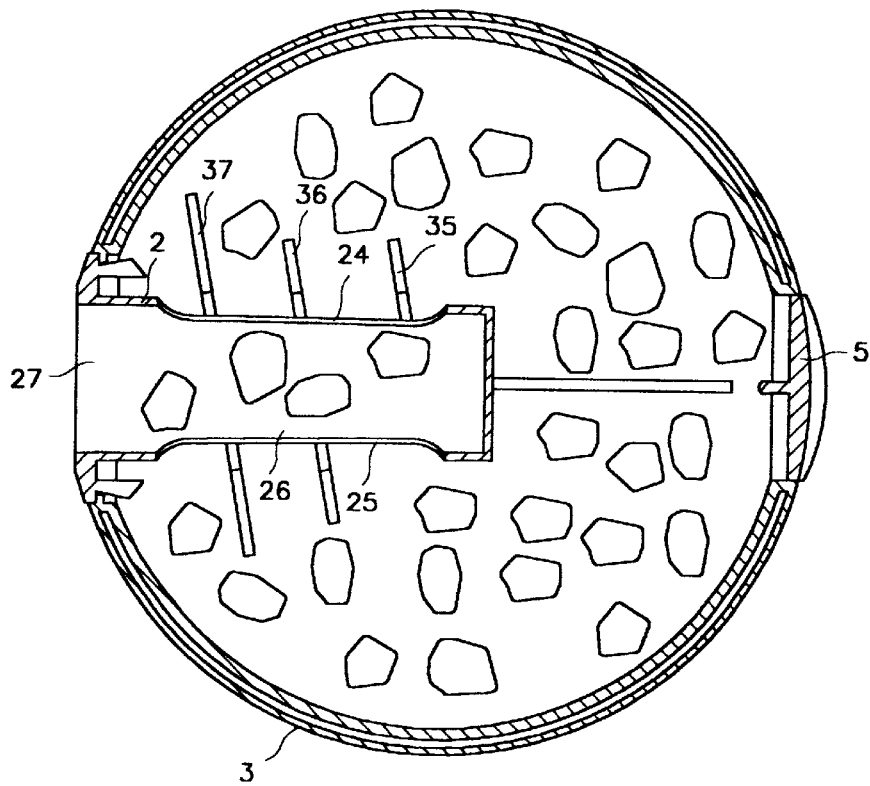
FIG. 5 is similar to FIG. 4 but showing dog food contained in the ball-like dog toy.

Referring to FIG. 5 and FIGS. 2 and 4 again, the second hemispherical half 4 comprises a first rib 46, a second rib 47, a third rib 48, a first partition board 45, and a second partition board 49. The second rib 47 and the third rib 48 are flat boards transversely arranged in parallel inside the second hemispherical half 4, each having two opposite ends respectively spaced from the peripheral wall of the second hemispherical half 4 at a distance, and a semi-circular top notch 50 or 51 on the middle. The first partition board 45 and the second partition board 49 are respectively perpendicularly extended from the first rib 46 and the second rib 47 in reversed directions and respectively connected to the peripheral wall of the second hemispherical half 4. The third rib 48 is a flat board perpendicularly extended from the second partition board 49 at one side and disposed in parallel with the first rib 46 and the second rib 47, having a top notch 52 extended from the second partition board 49. The ribs 35,36,37,46,47,48 reinforce the structural strength of the hemispherical halves 3,4, and slant to one side (see also FIG. 4). When the hemispherical halves 3,4 are fastened together, the ribs 35,36,37,46,47,48 form a plurality of slanting annular members for holding the cylindrical valve 2, enabling dog food 6 to be rotatably moved along the ribs 35,36,37, 46,47,48 (slanting annular members) into the cylindrical valve 2 (see also FIG. 5).

Referring to FIG. 3 and FIGS. 2 and 5 again, the cylindrical valve 2 is injection-molded from plastics, comprising an expanded head 21 at one end, which is received in the circular hole of the semi-circular peripheral notches 33,43 and stopped at the stop flanges 34,44 at an outerside, a plurality of retaining spring rods 22 axially backwardly extended from the expanded head 21, which secure the expanded head 21 to the stop flanges 34,44, enabling the cylindrical valve 2 to be rotated in the circular hole of the semi-circular peripheral notches 33,43, a stop rod 23 raised from the expanded head 21 and rotatably moved with the expanded head 21 in the circular hole of the semi-circular peripheral notches 33,43 between the two stop flanges 44 of the second hemispherical half 4 to limit the angle of rotation of the cylindrical valve 2 in the circular hole of the semi-circular peripheral notches 33,43, two input holes 24,25 aligned at two opposite sides of the valve body thereof, an output hole 27 at the center of the expanded head 21, a passage way 26 in communication between the input holes 24,25 and the output hole 27, and an indicator 20 at the front side of the expanded head 21. The retaining spring rods 22 are forced inwards, and then inserted into the circular hole of the semi-circular peripheral notches 33,43. After insertion into the circular hole of the semi-circular peripheral notches 33,43, the retaining spring rods 22 are returned to their former shape by their springy material property to secure the expanded head 21 to the stop flanges 34,44. When the stop rod 23 of the cylindrical valve 2 is stopped at one stop flange 44, the input ports 24,25 are respectively aligned with the stop board 38 of the first hemispherical half 3 and the second partition board 49 of the second hemispherical half 4, and dog food 6 is hindered by the stop board 38 and the partition board 49 from passing to the input ports 24,25. Under this condition, few dog food 6 is released through the cylindrical valve 2. On the contrary, when the stop rod 23 of the cylindrical valve 2 is stopped at the other stop flange 44, the input ports 24,25 are spaced from the stop board 38 of the first hemispherical half 3 and the second partition board 49 of the second hemispherical half 4 at a distance, and therefore dog food 6 is allowed to pass into the cylindrical valve 2 through the input ports 24,25. When dog food 6 falls to the inside of the cylindrical valve 2, it is immediately forced out of the output port 27 when the ball-like dog toy 10 is played by the dog. Through the indicator 20, the cylindrical valve 2 can be turned to the desired angle to regulate the dispensing volume of dog food 6. Further, the cylindrical valve 2 can easily be disconnected from the spherical shell 1 by: inserting a finger through the output port 27 into one input port 24 or 25, and then pulling the cylindrical valve 2 outwards by force.

Referring to FIGS. 2 and 4 again, the spherical shell 1 has a recessed circular seat 12 at the periphery opposite to the cylindrical valve 2, a pin hole 13 at the center of recessed circular seat 12, a substantially D-shaped water filling hole 14 through a part of the recessed circular seat 12, and a plurality of recessed portions (not shown). The cap 5 has a pin 53 raised from the center of the back side wall thereof, a substantially D-shaped opening 54, and raised portions 55 at the back side wall corresponding to the recessed portions in the recessed circular seat 12. The pin 53 is inserted into the pin hole 13, enabling the cap 5 to be rotated on the recessed circular seat 12, and set between a first position where the opening 54 and the water filling hole 14 are aligned (i.e., the water filling hole 14 is opened), and a second position where the opening 54 and the water filling hole 14 are not aligned (i.e., the water filling hole 14 is closed). The raised portions 55 of the cap 5 are coupled to the recessed portions in the recessed circular seat 12 to hold the cap 5 in the set position. When the water filling hole 14 is opened, water is filled into the spherical shell 1, and the output port 27 of the cylindrical valve 2 is stopped with the palm, and then the spherical shell 1 is shaken with the hand, enabling the inside of the ball-like dog toy 10 to be washed. After washing, waste water is poured out of the output port 27 of the cylindrical valve 2.

Figure 6:
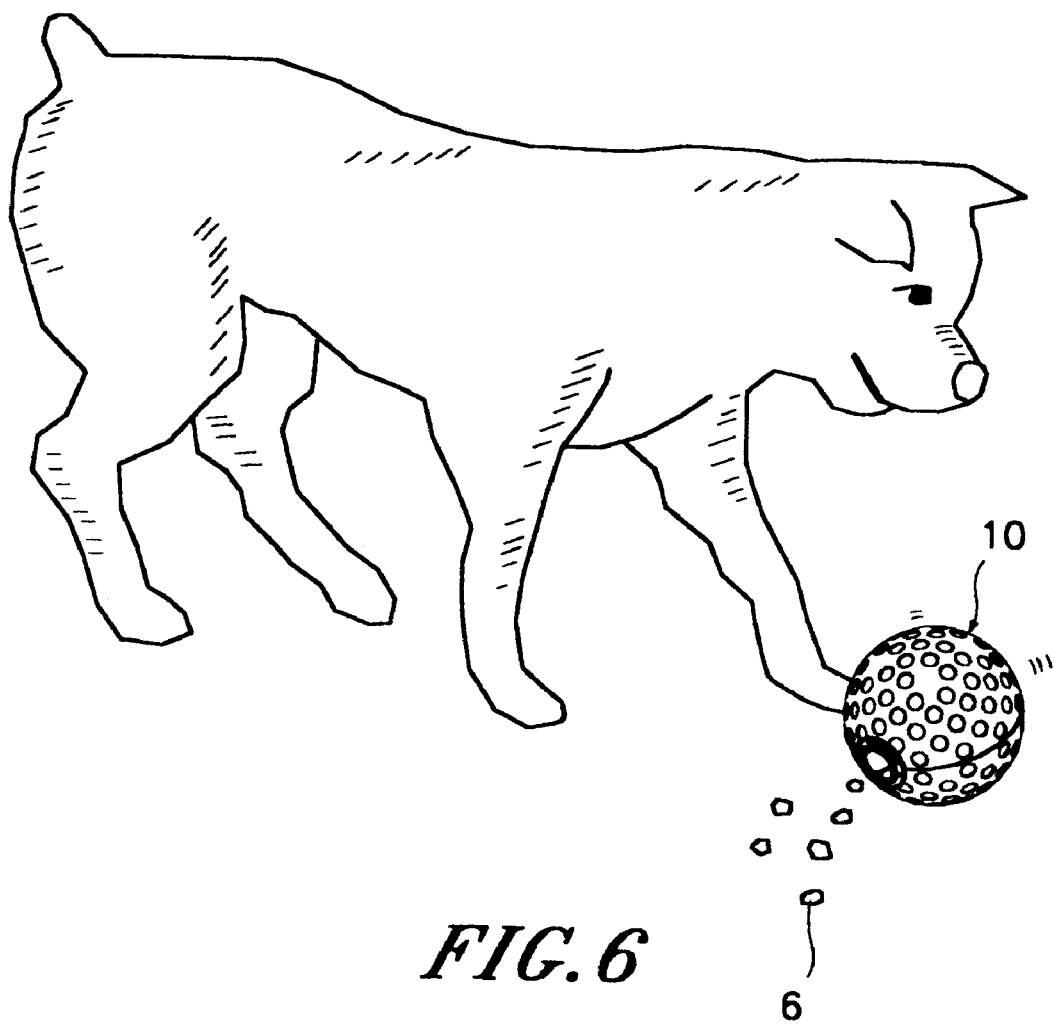
FIG. 6 is an applied view of the present invention, showing the spherical shell rolled on the ground, dog food discharged out of the cylindrical valve.

Referring to FIG. 6 and FIG. 5 again, when the ball-like dog toy 10 is filled with dog food 6 and the cylindrical valve 2 is set in the circular hole of the semi-circular peripheral notches 33,43 at a particular angle, it is given to the dog for playing. When the dog kicks the ball-like dog toy 10, the ball-like dog toy 10 is moved on the ground, and at the same time dog food 6 is forced out of the output port 27 of the cylindrical valve 2 of the ball-like dog toy 10 for eating. If the dog stops from playing with the ball-like dog toy 10, the dispensing of dog food 6 is immediately stopped. Therefore, the dog can get dog food when playing with the ball-like dog toy 10.

While only one embodiment of the present invention has been shown and described, it will be understood that various modifications and changes could be made thereunto without departing from the spirit and scope of the invention. For example, the shell 1 can have any of a variety of shapes that can be smoothly moved on the ground.

What the invention claimed is:

1. A ball-like dog toy comprising a hollow ball-like shell formed of a first half shell and a second half shell for holding dog food, and a cylindrical valve mounted in said ball-like shell for dispensing dog food, where:

said first half shell of said ball-like shell comprises a semi-circular peripheral notch, a stop flange in the semi-circular peripheral notch of said first half shell, an angled first rib, the angled first rib of said first half having one end connected to the periphery of said first half shell, an opposite end spaced from the periphery of said first half shell at a distance, and an arched top notch, a second rib transversely disposed on the inside, the second rib of said first half shell having two opposite ends respectively spaced from the peripheral wall of said first half shell at a distance and a semi-circular top notch on the middle, a third rib transversely disposed on the inside, the third rib of said first half shell having two opposite ends respectively connected to the peripheral wall of said first half shell and a semi-circular top notch on the middle in line with the semi-circular top notch at the second rib of said first half shell and the arched top notch at the first rib of said first half shell for supporting said cylindrical valve, and a stop board perpendicularly extended outwards from the third rib of said first half shell on the middle and connected to the peripheral wall of said first half shell;

said second half shell comprises a semi-circular peripheral notch forming with the semi-circular peripheral notch of said first half shell a circular hole, at least one stop flange in the semi-circular peripheral notch of said second half shell, a first rib, a second rib, a third rib, a first partition board, and a second partition board, the second rib and third rib of said second half shell being flat boards transversely arranged in parallel and respectively matched with the second rib and third rib of said first half shell, each having two opposite ends respectively spaced from the peripheral wall of said second half shell at a distance and a semi-circular top notch on the middle, the first partition board and second partition board of said second half shell being respectively perpendicularly extended from the first rib and second rib of said second half shell in reversed directions and respectively connected to the peripheral wall of said second half shell, the third rib of said second half shell being a flat board perpendicularly extended from the second partition board of said second half shell at one side and disposed in parallel with the first rib and second rib of said second half shell, the third rib of said second half shell having a top notch extended from the second partition board of said second half shell;

said cylindrical valve is installed in the circular hole of the semi-circular notches of said first half shell and said second half shell and supported in the top notches of the first rib, second rib and third rib of said first half shell and the top notches of the first rib and second rib of said second half shell, comprising an expanded head received in the circular hole of the semi-circular peripheral notches of said first half shell and said second half shell and rotated with said cylindrical valve in the circular hole, a plurality of retaining spring rods axially backwardly raised from said expanded head and coupled to the top flange of said first half shell and the at least one stop flange of said second half shell to secure said expanded head to said spherical shell for permitting said cylindrical valve to be rotated in the circular hole of the semi-circular notches of said first half shell and said second half shell, two input holes aligned at two opposite sides of a valve body thereof, an output hole at the center of said expanded head, a passage hole defined within the valve body in communication between said input holes and said output hole.

2. The ball-like dog toy of claim 1 wherein said first half shell of said spherical shell comprises a coupling edge, and a coupling groove at the coupling edge of said first half shell; said second half shell of said spherical shell comprises a coupling edge abutted against the coupling edge of said first half shell, and a coupling flange raised from the coupling edge of said first half shell and engaged into the coupling groove at the coupling edge of said first half shell.

3. The ball-like dog toy of claim 1 wherein the at least one stop flange in the semi-circular peripheral notch of said second half shell includes two stop flanges spaced by a space; said cylindrical valve comprises a stop rod raised from said expanded head and inserted in the space between the two stop flanges in the semi-circular peripheral notch of said second half shell and moved with said cylindrical valve between the two stop flanges in the semi-circular peripheral notch of said second half shell to limit the angle of rotation of said cylindrical valve in the circular hole of the semi-circular notches of said first half shell and said second half shell.

4. The ball-like dog toy of claim 1 wherein said spherical shell comprises a recessed circular seat at the periphery opposite to said cylindrical valve, a water filling hole through a part of said recessed circular seat, a pin hole at the center of said recessed circular seat, and a rotary cap coupled to said recessed circular seat and turned to close/open said water filling hole, said rotary cap having a coupling pin coupled to said pin hole.

5. The ball-like dog toy of claim 1 wherein said expanded head of said cylindrical valve has indicator means for indicating the direction of rotation of said cylindrical valve in the circular hole of the semi-circular notches of said first half shell and said second half shell in regulating the dispensing volume of dog food through said cylindrical valve.

6. The ball-like dog toy of claim 1 wherein said spherical shell has a plurality of circular recesses over the outside surface thereof.

7. The ball-like dog toy of claim 4 wherein said recessed circular seat has a plurality of recessed portions, said rotary cap has a plurality of raised portions respectively engaged into said recessed portions.

* * * * *